(12) United States Patent
Palfenier et al.

(10) Patent No.: US 6,774,623 B2
(45) Date of Patent: Aug. 10, 2004

(54) MOUNTING BRACKET FOR HOLDING SENSOR ASSEMBLY TOGETHER

(75) Inventors: Samuel Roland Palfenier, El Paso, TX (US); Stephen G Paddock, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 142 days.

(21) Appl. No.: 10/268,559

(22) Filed: Oct. 10, 2002

(65) Prior Publication Data

US 2004/0069914 A1 Apr. 15, 2004

(51) Int. Cl.[7] .............................. G12B 9/04; G01P 1/02; G01P 3/48; G01B 7/30
(52) U.S. Cl. .................... 324/207.15; 324/174; 73/493; 73/866.5
(58) Field of Search ....................... 324/207.15–207.17, 324/207.22, 207.25, 174, 262; 73/118.1, 128, 493–494, 431, 866.5, 756; 248/600, 620, 674, 125.7, 309.1, 900

(56) References Cited

U.S. PATENT DOCUMENTS

| | | | | |
|---|---|---|---|---|
| 4,616,504 A | * | 10/1986 | Overcash et al. | 73/118.1 |
| 5,065,892 A | * | 11/1991 | Lukez | 220/694 |
| 5,103,170 A | * | 4/1992 | Grillo et al. | 324/173 |
| 5,486,758 A | * | 1/1996 | Hammerle | 327/174 |
| 5,563,510 A | * | 10/1996 | Gorrell et al. | 324/174 |
| 5,675,248 A | * | 10/1997 | Kurita et al. | 324/174 |
| 5,922,953 A | * | 7/1999 | Payne et al. | 73/494 |
| 6,123,301 A | | 9/2000 | Schroeder et al. | |
| 6,405,593 B1 | | 6/2002 | Palfenier et al. | |
| 6,453,732 B2 | | 9/2002 | Schroeder et al. | |
| 6,581,484 B1 | * | 6/2003 | Schuler | 73/866.5 |

* cited by examiner

*Primary Examiner*—N. Le
*Assistant Examiner*—Darrell Kinder
(74) *Attorney, Agent, or Firm*—Jimmy L. Funke

(57) ABSTRACT

In an electronic sensor having a spool assembly and a housing cap, the spool assembly has a pair of grooves formed in the exterior surface and located diametrically opposed from each other. The housing cap has a pair of apertures configured and positioned in the cap to align with the grooves in the spool. The grooves and aperture are configured for receiving portions of a mounting bracket. When the mounting bracket is installed on the electronic sensor, a radial spring in communication with the spool assembly and housing cap maintains the mounting bracket in a locked relationship with the spool assembly and housing cap and minimizes the stack up tolerances from a reference surface to the tip of the electronic sensor.

7 Claims, 3 Drawing Sheets

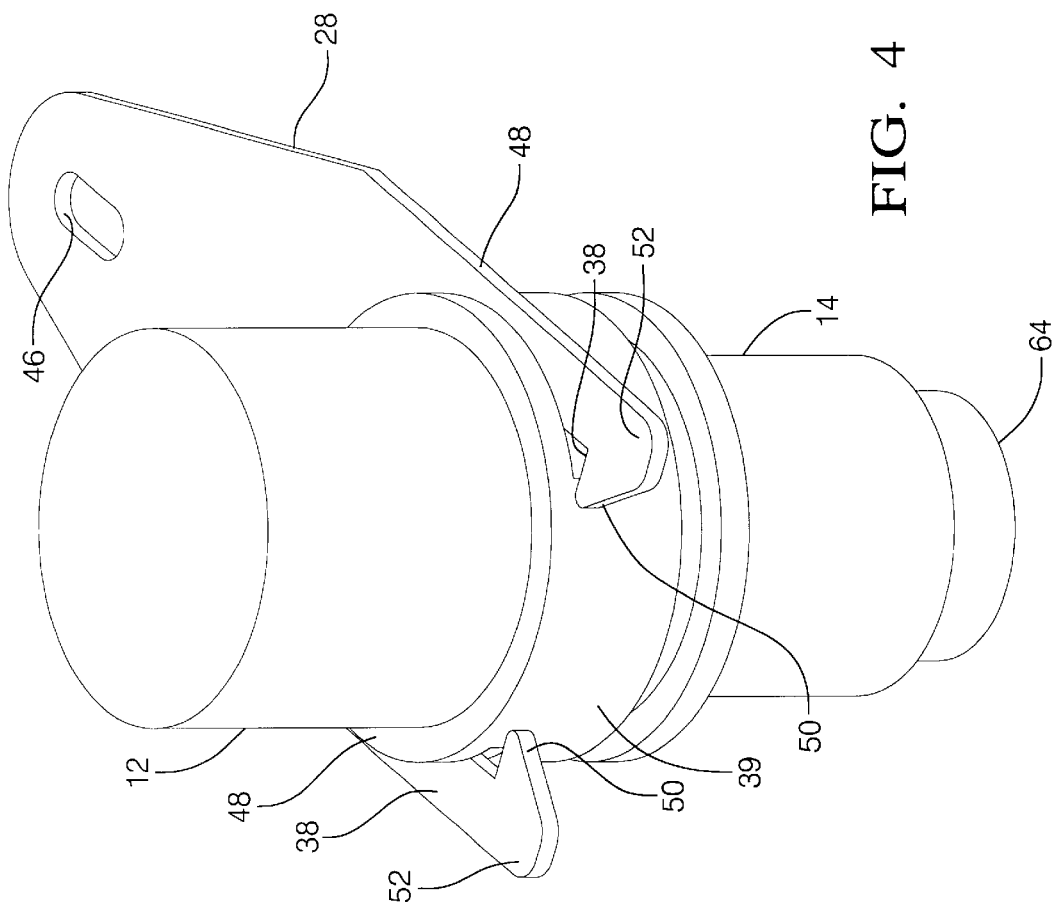
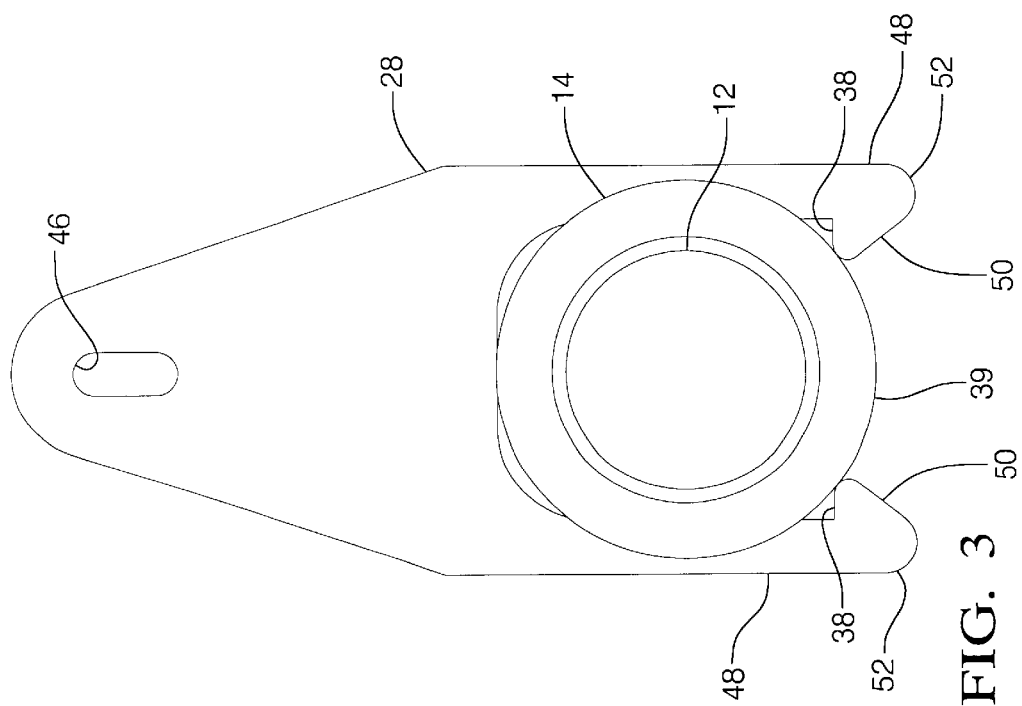

US 6,774,623 B2

MOUNTING BRACKET FOR HOLDING SENSOR ASSEMBLY TOGETHER

TECHNICAL FIELD

The invention relates to electronic sensors and more particularly to electronic sensor assemblies having a cap retained onto the sensor with a bracket.

BACKGROUND OF THE INVENTION

Electronic sensors which are suitable for detecting discontinuities, such as gear teeth, along a target surface are well known and used in automotive applications such as brake systems, cruise control systems, transmission systems, as well as others. In its environment of use, the sensor apparatus requires a support structure, a sensor housing, and a means for mounting the sensor housing onto the support structure. The stack-up of tolerances of the components comprising the sensor within the housing in addition to the stack-up of tolerances associated with connection to the mounting bracket for mounting the sensor housing onto the support structure contribute to the difficulty of establishing the precise length of the air gap between the sensor and the target surface. In addition, the location of the sensor and target surface may be hidden and therefore it may be difficult, expensive, and impractical to precisely measure. Consequently, there is a need to minimize the stack-up of tolerances.

SUMMARY OF THE INVENTION

The invention provides a means to minimize the stack up of tolerances by incorporating the mounting bracket with the spool assembly of the sensor. The incorporation of the mounting bracket with the cap eliminates a step in the assembly of the sensor to the support structure. The design of the cap and mounting bracket assembly also reduces the height of the reference surface of the cap to the tip of the sensor. Therefore, the airgap is reduced and the overall cost of the internal components in the sensor is reduced.

The cap and spool assembly are modified to include elongate apertures and grooves respectively to receive portions of the mounting bracket. Tension means disposed between the cap and spool assembly maintain the portions of the mounting bracket within the elongate aperture and grooves. The cap further includes locking or snap fit features for securely attaching to hooked portions on the mounting bracket.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a top planar view of the sensor assembly of the grooves formed therein;

FIG. 4 is a perspective view of a portion of the sensor assembly showing legs on the mounting bracket connected to the cap and spool assembly.

DESCRIPTION OF THE PREFERRED EMBODIMENT

Figure 2:
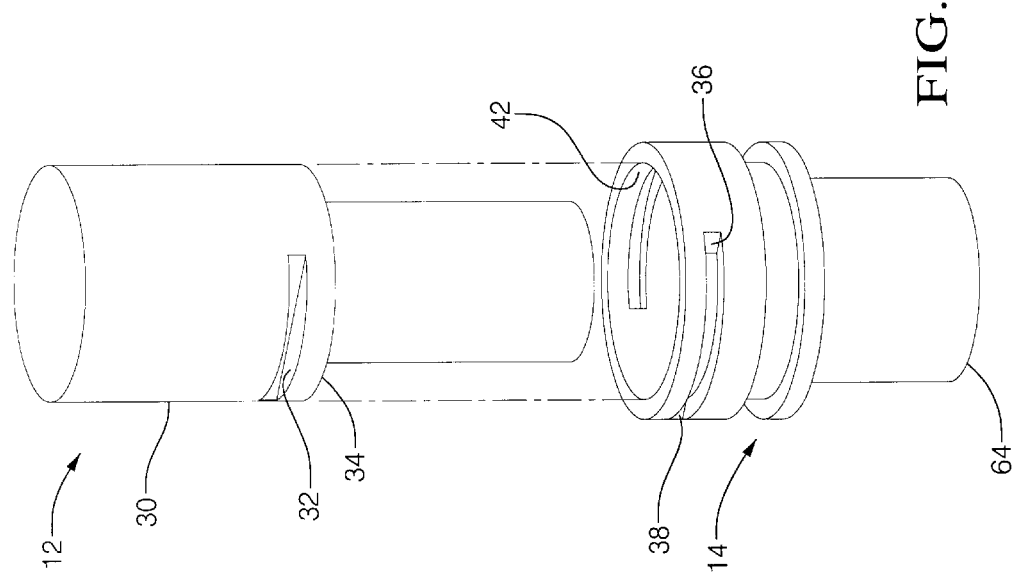
FIG. 2 is an exploded view of the spool assembly and cap.
Figure 1:
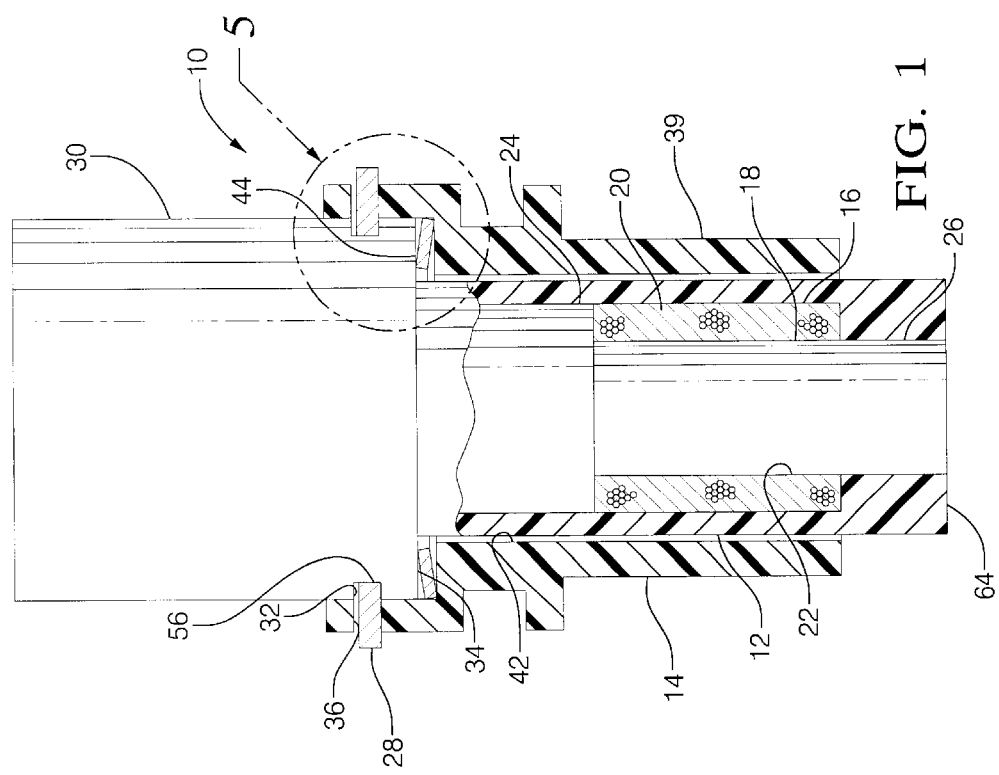
FIG. 1 is a side sectional view of a sensor assembly showing a cap and mounting bracket connected to a spool assembly in accordance with the principal of the present invention.
Figure 5:
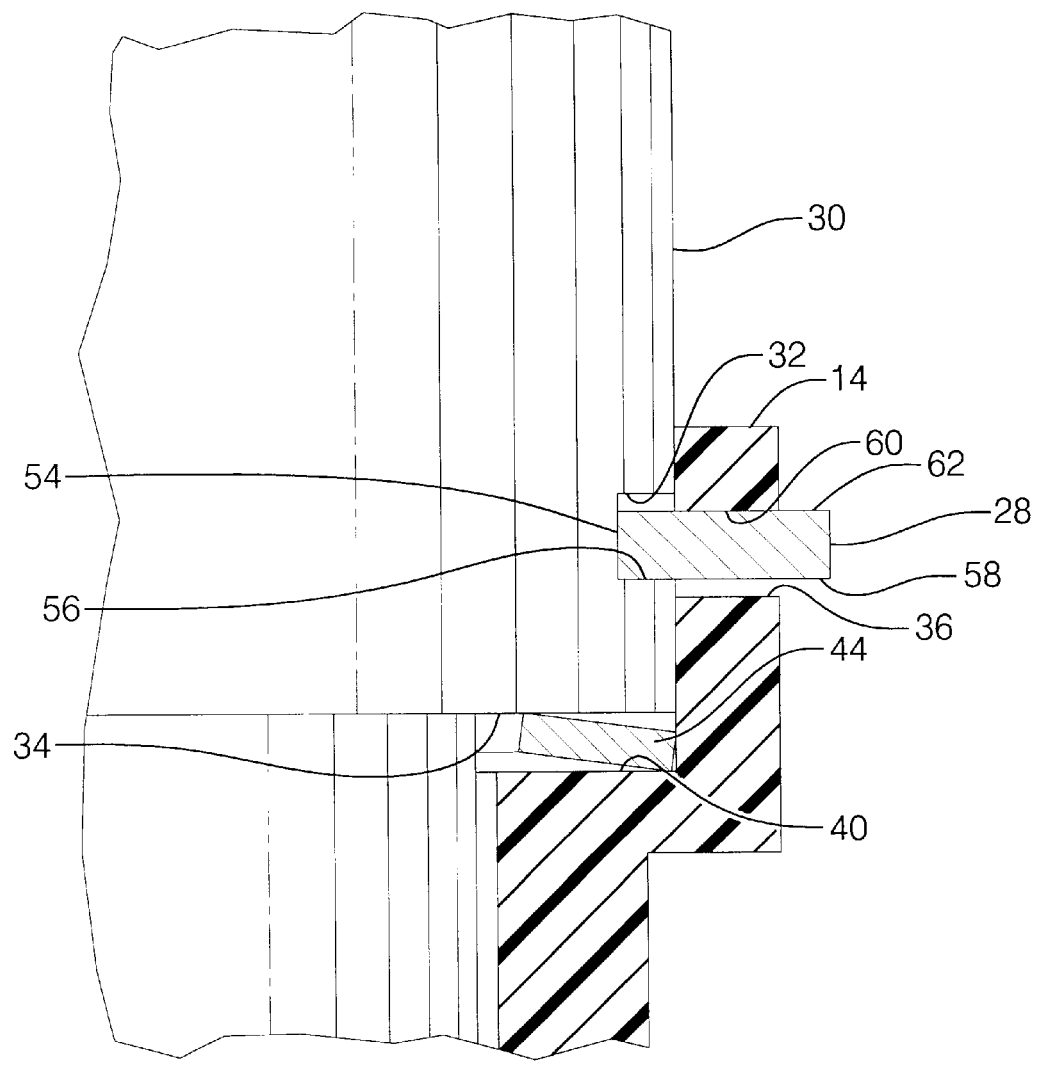
FIG. 5 is an enlarged view of the circled area in FIG. 1.

Referring to the FIGS. 1–5, a conventional electronic sensor assembly 10 includes a spool assembly 12 and a cap 14. The spool assembly 12 will have a spool 16 portion having a barrel 18 around which magnet wire 20 is wound to form a coil. Axially extending completely through the spool barrel is a bore 22. A magnet 24 and a pole piece 26 are inserted through the spool bore 22. Depending upon the application, either the magnet 24 or the pole piece 26 may be inserted first within the bore 22. The pole piece 26 is preferably made of mechanically and magnetically soft ferrous material.

A hollow sensor housing or cap 14 is provided to encapsulate the spool assembly to protect the spool assembly 12 from corrosive liquid/or spill and against any abrasion that might occur due to contact with abrasive materials, such as rotating members or metallic particles. The cap 14 is preferably made of a thermoplastic resin or other nonmagnetic material.

In the prior art, the cap was permanently attached to the spool assembly 12 by means of commercially available adhesives. The sensor assembly 10, including the spool assembly 12 and cap 14, was then mounted by conventional mounting means to a support structure.

The improvement to the electronic sensor assembly 10 is shown in the drawings, FIGS. 1–5, wherein a mounting bracket 28 is incorporated into the electronic sensor assembly 10 and used for retaining the spool assembly 12 and cap 14 in locked engagement with one another. According to the invention, the spool assembly 12, the cap 14, and the mounting bracket 28 are configured so that when the mounting bracket 28 is connected to the sensor assembly 10, a portion of the mounting bracket 28 also locks the cap 14 onto the spool assembly 12.

The spool assembly 12 has a cylindrical exterior surface 30. The cylindrical exterior surface 30 has a pair of radial grooves 32 formed therein. The radial grooves 32 are positioned diametrically across from each other and have an elongate formation for receiving a portion of the bracket 28 as discussed hereinafter. Proximate to the radial grooves 32, the spool assembly 12 has a portion with a reduced diameter. An exterior annular ledge 34 on the spool assembly 12 is formed at the reduced diametric portion. The ledge 34 defines a stop for the cap 14.

The cap 14 has a conventional formation for encapsulating the spool assembly 12 and includes the following improvements. The cap 14 includes a pair of through radial apertures 36 diametrically opposed from each other and located for alignment with the grooves 32 in the spool assembly 12. Each radial aperture 36 in the cap 14 has an elongate formation having a radial length longer than the radial length of the groove 32 in the spool assembly 12. The cap 14 includes a locking or snap fit feature 38 located at one end of each radial aperture 36 on the cap. The locking or snap fit feature 38 is a projection or tab extending from the exterior surface 39 of the cap 14 for receiving a portion of the mounting bracket 28 as disclosed hereinafter. The cap 14 further includes an annular shelf 40 formed on its interior surface 42 for receiving a radial spring device 44.

The mounting bracket 28 is an essentially planar structure having a mounting means 46 at one end for connection with a fastener to operationally mount the mounting bracket 28 to the support structure. The mounting means 46 may include an aperture 46 for receiving a portion of the fastener. Spaced from the through mounting means 46, the mounting bracket 28 bifurcates to form a pair of legs 48. The legs 48 form inwardly directed hooks 50 at their free ends 52. The legs 48 of the mounting bracket 18 have a certain amount of resiliency that allows them to temporarily spread for sliding along opposing sides of the cap 14.

The assembly of the housing cap 14 and mounting bracket 28 onto the spool assembly 12 are discussed hereinafter. Before the spool assembly 12 is placed into the cap 14, the radial spring device 44, such as a spring, seal, wave washer, etc., is assembled in the cap. The radial spring device 44 is disposed on the annular shelf 40 of the cap. When the spool assembly 12 is placed into the cap 14 the annular ledge 34 of the spool assembly 12 contacts the radial spring device 44 on the annular shelf 40 of the cap 14. To install the mounting bracket 28 onto the cap 14, a predetermined compressive force is applied to the spool assembly 12 and the spring device 44 until the grooves 32 in the exterior surface 30 of the spool assembly 12 aligns with the apertures 36 in the cap 14. The predetermined compressive force is maintained to align the grooves 32 and apertures 36 of the spool assembly 12 and cap 14, respectively, while the mounting bracket 28 is placed onto the cap 14. As the mounting bracket 28 approaches the spool assembly 12 and cap 14, the cap 14 is aligned so that the snap fit features 38 are directed away from the mounting bracket 28. While the spool assembly 12 is held under tension, the bifurcated legs 48 of the mounting bracket 28 are slid along the diametrically opposing sides of the cap 14 adjacent the location of the groove 32 and apertures 36. The bifurcated legs 48 on the bracket have some resiliency and expand to allow the bracket 28 to slide around the cap through the apertures 36 and the grooves 32. The bracket legs 48 spring closed to a locked position when the hooked ends 50 of the legs 48 clear the snap-fit feature 38. In the locked position, the inner surfaces 54 of the legs 52 are disposed within the grooves 32 of the spool assembly 12 and apertures 36 of the cap 14 to hold the spool assembly 12 and cap 14 together.

Once the mounting bracket 28 is fully inserted and in the locked position, the pressure that is exerted on the spool assembly 12 to compress the spring 44 is released. As the pressure is released, the tension of the radial spring 44 forces the bottom edge 56 of the spool groove 32 against the bottom edge 58 of the bracket 28. At the same time, the top edge 60 of the cap apertures 36 is forced against the top edge 62 of the bracket 28. In this manner, the mounting bracket 28 locks the spool assembly 12 and cap 14 together and the tension of the radial spring 44 maintains the mounting bracket 28 in the locked position with the spool assembly 12 and cap 14.

The bottom surface 58 of the mounting bracket 28 becomes the sensor reference surface 58 when installed in the customer's application. The sensor reference surface 58 is known and therefore the only stack-up from the sensor reference surface 58 to the tip 64 of the sensor is the distance from the tip 64 of the sensor to the bottom edge 56 of the groove in the spool assembly 12. This distance is entirely controlled in one part, i.e. the spool assembly 12, thereby reducing the stack-up of the sensor assembly 10 compared to a conventional design which uses the cap 14 and a spool assembly 12 as part of the reference surface to tip 64 stack-up.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An improved electronic sensor assembly having a spool assembly including a spool, and a cap for sealing over the spool assembly, the improvement comprising:

a mounting bracket slidably connectable to the spool assembly and cap, said mounting bracket having means for holding the spool assembly and cap together; and tension means for mounting the mounting bracket in a locked relationship with the spool assembly and cap.

2. The improved sensor assembly of claim 1, wherein the spool assembly has a pair of grooves in an exterior wall and said cap has apertures for aligning with said grooves in the spool assembly, wherein said grooves in the spool and apertures in the cap receive a portion of said bracket.

3. The improved sensor assembly of claim 2, wherein said cap has an upper interior shelf for receiving the tension means and said tension means is in contact with a corresponding ledge on an exterior surface of the spool.

4. The improved sensor assembly of claim 2 wherein the tension means is a radial spring, wherein when the grooves of the spool assembly align with the apertures in the cap, the radial spring is compressed to a predetermined pressure.

5. The improved sensor assembly of claim 2 further comprising a radial spring device for aligning the grooves in the spool with the apertures in the cap.

6. The improved sensor assembly of claim 2 further comprising a snap fit feature disposed at one end of each elongate aperture.

7. The improved sensor assembly of claim 6, further comprising a pair of legs at one end of the mounting bracket, each leg having a hooked end for receiving the snap fit feature.

* * * * *